United States Patent [19]
Kikuchi

[11] Patent Number: 4,794,763
[45] Date of Patent: Jan. 3, 1989

[54] DEVICE FOR PROTECTING A COMPRESSOR FROM DAMAGE

[75] Inventor: Yasuo Kikuchi, Gunma, Japan

[73] Assignee: Sanden Corporation, Gunma, Japan

[21] Appl. No.: 82,910

[22] Filed: Aug. 10, 1987

Related U.S. Application Data

[63] Continuation of Ser. No. 832,667, Feb. 25, 1986, abandoned.

[30] Foreign Application Priority Data

Feb. 25, 1985 [JP] Japan .................... 60-24684[U]

[51] Int. Cl.⁴ .................... F16K 21/18; F25B 1/00
[52] U.S. Cl. .................... 62/228.1; 62/509; 137/392
[58] Field of Search .............. 137/432, 392; 62/228.1, 62/509, 129, 126

[56] References Cited

U.S. PATENT DOCUMENTS

| | | | |
|---|---|---|---|
| 2,692,923 | 10/1954 | Ash .................... | 137/432 X |
| 3,233,625 | 2/1966 | Pase .................... | 137/432 X |
| 3,744,267 | 7/1973 | Norbeck .................... | 62/228.1 X |
| 4,285,207 | 8/1981 | Sugiura et al. .................... | 62/228.1 |
| 4,447,743 | 5/1984 | Bean et al. .................... | 137/392 X |

FOREIGN PATENT DOCUMENTS

2540032  3/1977  Fed. Rep. of Germany ........ 62/509

*Primary Examiner*—William E. Wayner
*Attorney, Agent, or Firm*—Banner, Birch, McKie & Beckett

[57] ABSTRACT

A protection device for the compressor of an air conditioning system. The protection device comprises a refrigerant level detector positioned in a receiver dryer to detect the level of refrigerant. A control device is coupled to the level detector and prevents the operation of the compressor if the level of refrigerant is below a predetermined amount.

5 Claims, 3 Drawing Sheets

DEVICE FOR PROTECTING A COMPRESSOR FROM DAMAGE

This application is a continuation of application Ser. No. 832,667, filed Feb. 25, 1986, now abandoned.

TECHNICAL FIELD

This invention is related to the field of refrigerant compressors, and more particularly is directed to a device which protects a compressor from damage due to loss of refrigerant in the refrigerant circuit.

BACKGROUND OF THE INVENTION

In a conventional refrigerant circuit such as shown in FIGS. 8 and 9, operation of the compressor is controlled by magnetic clutch 17. Activation of magnetic clutch 17 is controlled by serially connected main switch 12 and air conditioner switch 13. Main switch 12 may also be the ignition switch of an automobile. In order to protect the compressor from inadvertent damage, a number of safety devices are provided including thermostat switch 14, low pressure cutout switch 19 and high pressure cutout switch 15. As shown in FIG. 8, each of these safety devices is serially connected with one another between air conditioner switch 13 and magnetic clutch 17. Thermostat switch 14 is disposed on the air outlet side of an evaporator (not shown) to detect the outlet air temperature. Low pressure cutout switch 19 is disposed between the high pressure chamber of the compressor and an expansion valve (not shown) to detect refrigerant pressure, i.e., to detect the amount of refrigerant enclosed in the refrigerant circuit. High pressure cutout switch 15 is disposed at the high pressure side of the compressor, e.g., in the discharge chamber of the compressor to detect dangerous high pressure levels. Thus, the operation of the compressor may be interrupted upon the occurence of abnormally high temperature or abnormally low or high pressure.

FIG. 9 illustrates another embodiment of the arrangement of conventional control devices for a compressor. In this embodiment, magnetic clutch 17 is controlled by main switch 12 through relay 16. The coil of relay 16 is serially connected with compressor switch 13 and thermostat switch 14, high pressure cutout switch 15 and low pressure cutout switch 19.

In the above-mentioned embodiments of safety devices for a refrigerant compressor, a pressure cutout switch functions as a refrigerant leakage detecting device. Since the pressure cutout switch detects the saturation pressure of the refrigerant, which changes in response to outside air temperature, the pressure cutout switch cannot reliably operate to detect refrigerant leakage.

Also, even though as much as fifty percent of the liquid refrigerant may remain in a refrigerant circuit, the compressor still cannot operate efficiently. Accordingly, the temperature of the discharged gas from the compressor is increased due to a lack of refrigerant. In addition, the lubricating oil for the compressor cannot be circulated properly when the refrigerant level is low.

One solution to the above-mentioned deficiencies in refrigerant systems known in the art is to increase the minimum pressure at which low pressure cutout switch 19 operates to stop the operation of the compressor. Thus, the operation of the compressor may be prevented even if there is liquid refrigerant remaining in the refrigerating circuit. However, when the external temperature is below a certain level, low pressure cutout switch 19 has a tendency to operate even if there is no leakage of refrigerant. Thus, the minimum pressure at which the low pressure cutout switch operates cannot be readily increased.

SUMMARY OF THE INVENTION

It is therefore, the primary object of the present invention to provide an improved device for protecting a compressor without dependence on detecting a low pressure condition in the refrigerant circuit.

It is another object of the present invention to provide a device for protecting a compressor wherein the protection device operates without influence from the external environment.

It is another object of the present invention to provide a device for protecting a compressor which is efficient and reliable in its operation.

The device for protecting a compressor according to this invention comprises a refrigerant level detector for detecting the amount of refrigerant in the refrigerant circuit and a control device. The level detector is disposed in a receiver dryer which is part of the refrigerating circuit. The detector detects the amount of refrigerant in the receiver dryer and generates a detection signal when the amount of refrigerant reaches a predetermined level. The detection signal is coupled to the control device which operates to stop the operation of the compressor. Thus, operation of the compressor ceases when a low level of refrigerant is detected in the receiver dryer.

Further objects, features and aspects of the present invention will be understood from the following description of the preferred embodiments of the invention and by referring to the annexed drawings.

DETAILED DESCRIPTION

Figure 1:
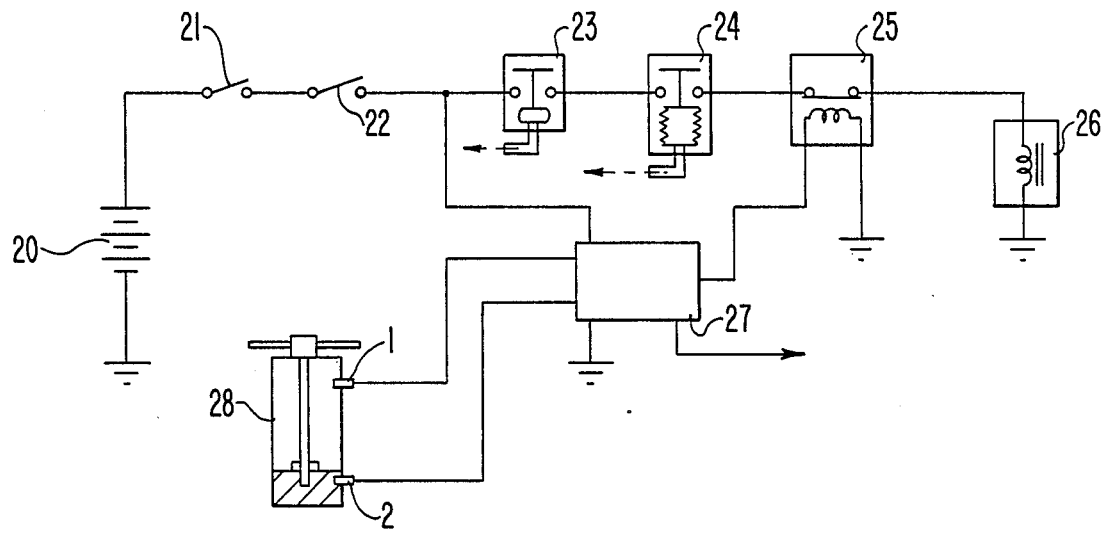
FIG. 1 is a wiring diagram of a protection device for a compressor in accordance with one embodiment of the present invention.

With reference to FIG. 1, an electrical control circuit for a copressor, including a protection device in accordance with one embodiment of this invention, is shown. The compressor forms parts of, for example, an air conditioning system which also includes an evaporator, condenser and a receiver dryer. The control circuit includes electric energy source 20, which may be the battery of an automobile, ignition or main switch 21, compressor or air conditioner switch 22, high pressure detector switch 23, thermostat switch 24, relay device 25 and electromagnetic clutch 26, each element being electrically connected in series with one another. High pressure detector switch 23 is positioned on the discharge line of the compressor to detect a change in refrigerant pressure and interrupts the operation of the compressor when the pressure reaches a predetermined value. Thus, the compressor is prevented from being damaged to high refrigerant pressure. Thermostat switch 24 is disposed on the outlet side of the evaporator to detect the temperature of the air passing through the evaporator and controls the operation of the compressor to achieve the desired temperature in the room or compartment being cooled. The control circuit also includes a protection device which comprises a refrigerant level detector and control device 27. The control device 27 is coupled to electric source 20 through switches 21, 22, and is also coupled to coil 25a of relay 25. The refrigerant level detector is positioned on receiver dryer 28 of the refrigerant circuit.

Figure 2:
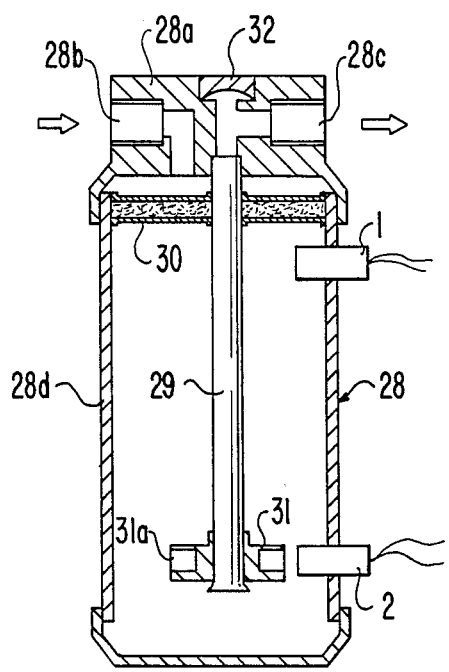
FIG. 2 is a cross-sectional view of a receiver dryer illustrating the position of the refrigerant level detector of the invention.

Receiver dryer 28 will be described with reference to FIG. 2. Generally, receiver dryer 28 comprises a cap portion 28a and a cylindrical casing 28d. Cap portion 28a is formed with an inlet port 28b and an outlet port 28c. A tube 29, which vertically extends within cylindrical casing 28d, is fitted on an end opening of outlet port 28c. A filter member 30 is fixedly disposed on an upper opening of casing 28d to cover the opening for removing water and dust from refrigerant entering the receiver dryer through inlet port 28b.

A float member 31, which is made of a resinous material and fitted with a magnetic element 31a at an outer peripheral surface thereof, is slidably disposed on tube 29, i.e., float member 31 is permitted to vertically move along tube 29. A pair of magnetic sensors 1 and 2 are disposed on the side surface of cylindrical casing 28c. One magnetic sensor 1 is placed on the upper portion of casing 28c opposed to a maximum level of liquid refrigerant in the receiver dryer and the other sensor 2 is placed on the lower portion of casing 29c opposed to a minimum level of liquid refrigerant in the receiver dryer.

When there is a leakage of refrigerant in receiver dryer 27, the level of the refrigerant gradually reduces. Thus, float member 31 moves downward in accordance with the reduction in liquid refrigerant. When the position of float member 31 is equal to or lower than the level corresponding to a suitable amount of refrigerant in a refrigerating circuit, float member 31 is positioned adjacent to magnetic sensor 2. Sensor 2 detects the presence of the magnetic member 31a disposed on float member 31 and generates a low refrigerant signal. This signal indicates a lack of refrigerant. Thus, float member 31 and magnetic sensor 2 cooperate to form a refrigerant level detection device. When control circuit 27 receives the detection signal from magnetic sensor 2, control circuit 27 operates to cause relay 25 to open its contacts. Thus, magnetic clutch 26 is deenergized to thereby stop the operation of the compressor. The low refrigerant signal may also activate an alarm indicating a low refrigerant condition.

When the refrigerant enclosed in the refrigerating circuit flows into receiver dryer 27, after being cooled down by a condensor (not shown), it is stored in receiver dryer 28 as liquid refrigerant. Thus, the level of refrigerant in the receiver dryer increases. Therefore, float member 31 moves upwardly in accordance with the increase in liquid refrigerant. When float 31 reaches a position adjacent magnetic sensor 1, the presence of magnetic member 31a is detected by magnetic sensor 1. Thus, magnetic sensor 1 generates a high refrigerant signal which indicates that the level of refrigerant in receiver dry 28 exceeds a predetermined amount. This signal is also coupled to control circuit 27 and may be used to sound an alarm indicating that refrigerant level is high.

When an air conditioner is initially started, the level of liquid refrigerant in receiver dryer 28 may be suddenly reduced. Thus, a delay circuit is provided within control circuit 27 to prevent a premature response to the presence of a low refrigerant signal.

Figure 3:
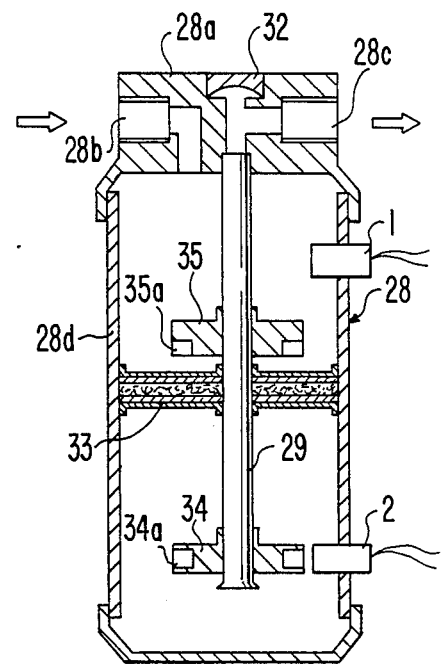
FIG. 3 is a cross-sectional view of a receiver dryer illustrating a second embodiment of the refrigerant level detector of the invention.

In the embodiment of the invention as shown in FIG. 3, a filter member 33 is placed at the center of cylindrical casing 28d and a pair of float members 34 and 35 are disposed on tube 29 with filter member 33 there between. Thus, float member 34, which is provided with magnetic member 34a at its outer surface, cooperates with the magnetic sensor 2 to detect a low refrigerant condition. Float member 35, which is positioned above filter member 33, and is provided with magnetic member 35a at its outer surface, cooperates with magnetic sensor 1 to detect a high refrigerant condition.

As mentioned above, the amount of liquid refrigerant which is stored in receiver dryer 28 is detected by the cooperation of a pair of sensors disposed on the casing of receiver dryer 28 and at least one float member. Thus, control of the compressor can be achieved without consideration of the external environment. Also, the timing of control of the compressor is determined only by a change in float member position.

Figure 4:
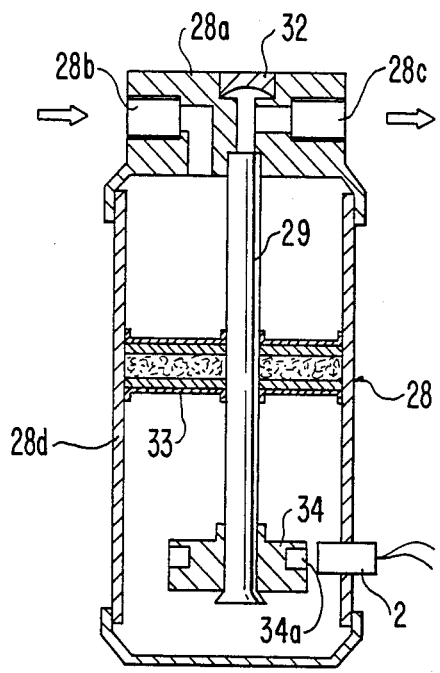
FIG. 4 is a cross-sectional view of a receiver dryer illustrating a third embodiment of the refrigerant level detector of the invention.

If it is not necessary to detect a high refrigerant level condition in the receiver dryer, sensor 1 and float member 35 shown in FIG. 3 may be eliminated as shown in FIG. 4. In this construction of the refrigerant level detection device, the efficiency of the device remains the same.

Figure 5:
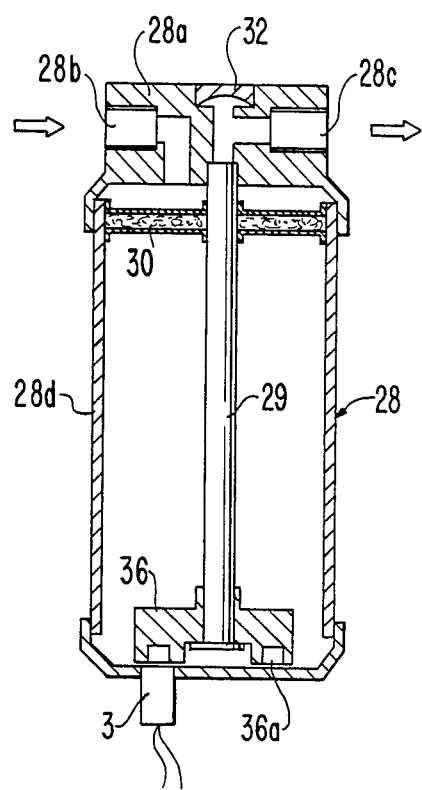
FIG. 5 is a cross-sectional view of a receiver dryer illustrating a fourth embodiment of the refrigerant level detector of the invention.

Float member 36 and the position of sensor 2 may be changed as shown in FIG. 5. In this embodiment, float member 36 is formed with a U-shaped cross-section and has magnetic member 36a at an end thereof. Magnetic sensor 3 is disposed on the bottom of cylindrical casing 28d. Magnetic sensor 3 detects the presence of magnetic member 36a by the distance therebetween.

Figure 6:
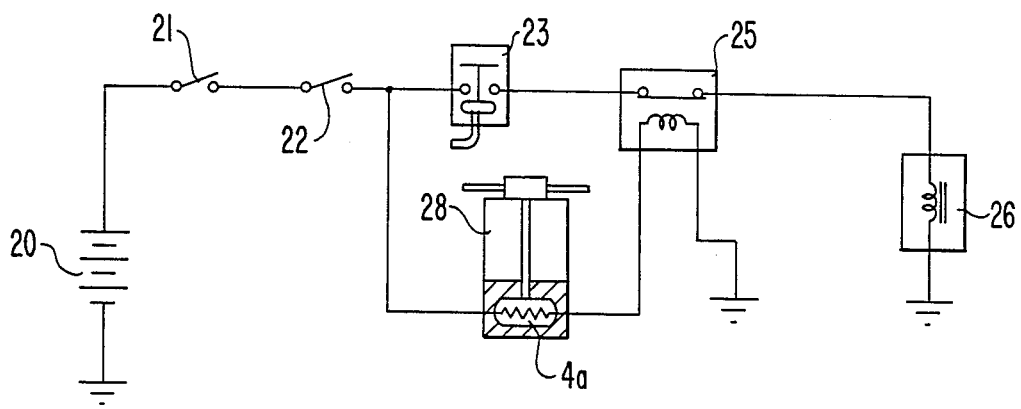
FIG. 6 is a wiring diagram of a protection device for a compressor in accordance with another embodiment of the present invention.

With reference to FIG. 6, an electrical control circuit including a protection device in accordance with another embodiment of the invention is shown. The control circuit comprises an electric source 20, ignition or main switch 21, air conditioner switch 22, thermostat switch 23, reply 25 and electromagnetic clutch 26. The operation of electromagnetic clutch 26 is controlled by thermostat switch 23 and relay 25 while the air conditioner is being operated. The protection device comprises sensor 4 which is connected between compressor switch 22 and thermostat switch 23. The other end of sensor 5 is connected to coil 25a of relay 25

Figure 7:
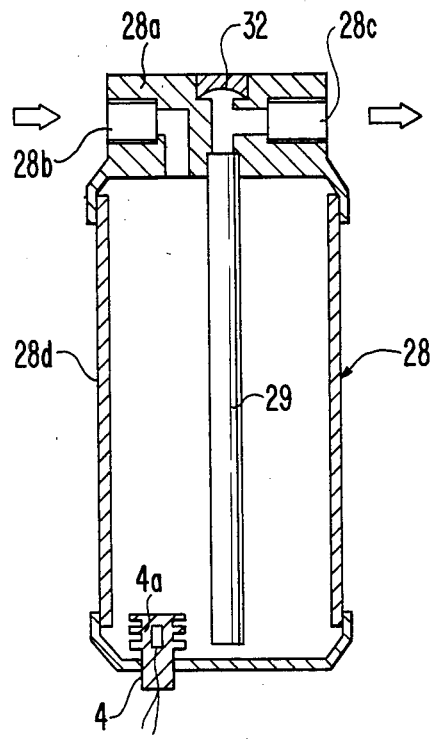
FIG. 7 is a cross-sectional view of a receiver dryer illustrating the position if the refrigerant level detector for the protection device shown in FIG. 6.
Figure 8:
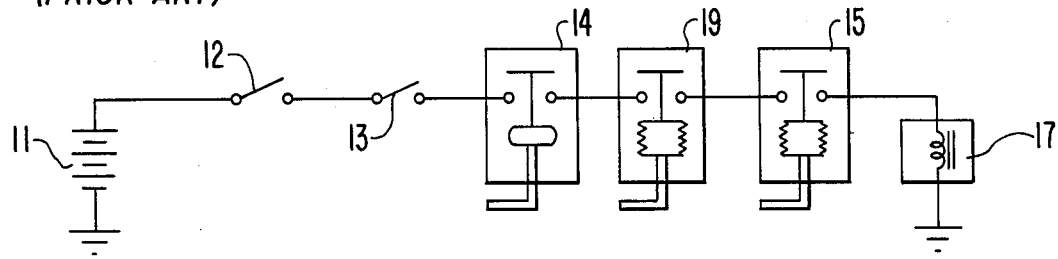
FIGS. 8 and 9 are wiring diagrams of a conventional protection device for a compressor.
Figure 9:
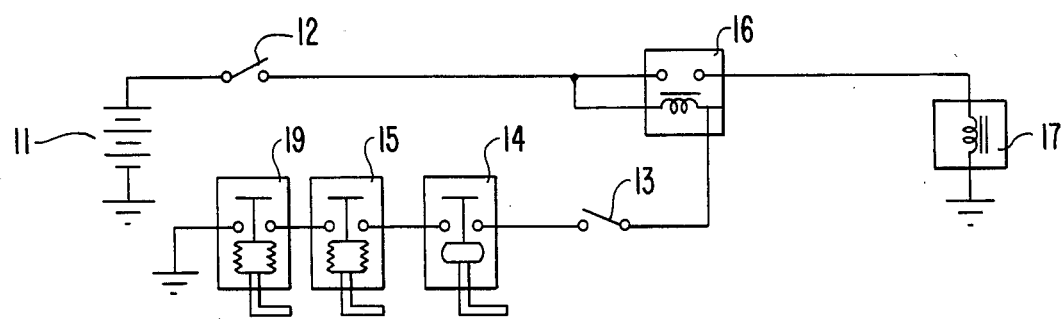

With reference to FIG. 7, sensor 4 includes resistor 4a which is formed of a positive temperature coefficient (PTC) ceramic. Sensor 4 is disposed on the bottom of receiver dryer 28. The resistance value of resistor 4a is normally very low. However, when electricity passes through resistor 4a, its resistance increases due to the temperature increase in the resistor caused by the current flow. As the resistance increases, there is a corresponding reduction in current flow through the resistor.

Since resistor 4a is cooled by the liquid refrigerant in receiver dryer 28, under normal conditions the value of its resistance is keep low. Thus, relay 25 is normally controlled by the operation of thermostat switch 23. When there is a refrigerant leak, however, and the amount of refrigerant which is stored in receiver dryer 28 is reduced, resistor 4a cannot be cooled to the same degree by the refrigerant. Thus, the temperature of resistor 4a gradually rises. Accordingly, when the temperature of resistor 4a exceeds a predetermined temperature and the current flow through the resistor is reduced to a predetermined amount, relay 25 is controlled to open its contacts. Thus, the operation of the compressor is stopped.

When the air conditioner is operated while the condenser cooling fan is off and/or the external temperature is very high, abnormally high pressure is generated in the refrigerant circuit and some elements in the circuit may be damaged. Under this condition, the temperature of the liquid refrigerant in receiver dryer 28 is increased. Therefore, resistor 4a cannot be fully cooled and the operation of the compressor is stopped as described above. Thus, in this embodiment of the invention the high pressure detecting switch may be eliminated from the control circuit.

This invention has been described in detail in connection with preferred embodiments. These embodiments, however, are merely for example only and the invention is not limited thereto. It will be easily understood by those sklilled in the art that variations and modifications can be easily made within the scope of this invention as is defined by the appended claims.

I claim:

1. In an air conditioning system having a refrigerant circuit which includes a compressor, a receiver dryer for storing liquid refrigerant and refrigerant within said refrigerant circuit, said receiver dryer having an inlet for receiving refrigerant and an outlet for discharging refrigerant, said outlet being coupled to an outlet extension which extends within said receiver dryer, the improvement comprising a protection device for controlling the operation of said compressor, said protection device comprising:

first detector means for detecting the amount of refrigerant in said receiver dryer, said detector means being formed of float means for floating within said receiver dryer in accordance with the level of said refrigerant and first sensor means for providing a first refrigerant level signal, said float means being movably disposed about said outlet extension for movement along a substantial portion of substantially the entire length of said extension in accordance with the level of refrigerant in said receiver dryer, said sensor means being fixedly disposed relative to said float means and includes means for detecting the presence of said float means, said sensor means producing said first refrigerant level signal when said sensor means detects the presence of said float means; and control means coupled to said detector for receivng said first refrigerant level signal and controlling the operation of said compressor in response to said first refrigerant level signal, wherein said control means prevents the operation of said compressor when said first refrigerant level signal is received.

2. The protection device of claim 1 wherein said float means includes a magnetic member and said sensor means includes means for detecting the presence of said magnetic member, said first detector means producing said first refrigerant level signal when said sensor means detects said magnetic means.

3. In an air conditioning system having a refrigerant circuit which includes a compressor, a receiver dryer for storing liquid refrigerant and refrigerant within said refrigerant circuit, said receiver dryer having an inlet for receiving refrigerant and an outlet for discharging refrigerant, said outlet being coupled to an outlet extension which extends within said receiver dryer, the improvement comprising a protection device for controlling the operation of said compressor, said protection device comprising:

first detector means for detecting the amount of refrigerant in said receiver dryer, said detector means being formed of float means for floating within said receiver dryer in accordance with the level of said refrigerant and first sensor means for providing a first refrigerant level signal, said float means being movably disposed about said outlet extension for movement along said extension in accordance with the level of refrigerant in said receiver dryer, said sensor means being fixedly disposed relative to said float means and includes means for detecting the presence of said float means, said sensor means producing said first refrigerant level signal when said first sensor means detects the presence of said float means:

control means coupled to said detector for receiving said first refrigerant level signal and controlling the operation of said compressor in response to said first refrigerant level signal, wherein said control means prevents the operation of said compressor when said first refrigerant level signal is received; and wherein said detector means includes second sensor means for providing a second refrigerant level signal, said second sensor means being fixedly disposed relative to said float means and includes means for detecting the presence of said float means, said second sensor means producing said second refrigerant level signal when said second sensor means detects the presence of said float means, said control means being coupled to said second sensor means to receive said second refrigerant level signal, wherein said first refrigerant level signal is produced when the refrigerant in said receiver dryer is below a predeterminative level and said second refrigerant level signal is produced when the refrigerant in said receiver dryer is above a predetermined level, wherein said control means controls the operation of said compressor to prevent compressor operation when said first refrigerant level signal is present or said second refrigerant level signal is present.

4. The protection device of claim 3 wherein said float means is movable between said first and said second sensor means in accordance with the level of refrigerant in said receiver dryer.

5. In an air conditioning system having a refrigerant circuit which includes a compressor, a receiver dryer for storing liquid refrigerant and refrigerant within said refrigerant circuit, said receiver dryer having an inlet for receiving refrigerant and an outlet for discharging refrigerant, said outlet being coupled to an outlet extension which extends within said receiver dryer, the improvement comprising a protection device for controlling the operation of said compressor, said protection device comprising:

first detector means for detecting the amount of refrigerant in said receiver dryer, said detector means being formed of float means for floating within said receiver dryer in accordance with the level of said refrigerant and first sensor means for providing a first refrigerant level signal, said float means being movably disposed about said outlet extension for movement along said extension in accordance with the level of refrigerant in said receiver dryer, said sensor means being fixedly disposed relative to said float means and includes means for detecting the presence of said float means, said sensor means producing said first refrigerant level signal when said sensor means detects the presence of said float means;

control means coupled to said detector for receiving said first refrigerant level signal and controlling the operation of said compressor in response to said first refrigerant level signal, wherein said control means prevents the operation of said compressor when said first refrigerant level signal is received;

wherein said protection device includes second detector means formed and adapted to operate in accordance with said first detector means and producing a second refrigerant level signal, said first detection means producing said first refrigerant level signal when the refrigerant in said receiver dryer is below a predetermined level and said second detector means producing said second refrigerant level signal when the refrigerant in said receiver dryer is above a predetermined level, said control means being coupled to said second detector means to receive said second refrigerant level signal and controlling the operation of said compressor to prevent compressor operation when said first refrigerant level signal or said second refrigerant level signal is received.

* * * * *